(12) United States Patent
Harris

(10) Patent No.: US 12,208,685 B2
(45) Date of Patent: Jan. 28, 2025

(54) ERGONOMIC SELECTOR CONFIGURATION

(71) Applicant: GHSP, Inc., Holland, MI (US)

(72) Inventor: Richard W. Harris, Wyoming, MI (US)

(73) Assignee: GHSP, Inc., Holland, MI (US)

( * ) Notice: Subject to any disclaimer, the term of this patent is extended or adjusted under 35 U.S.C. 154(b) by 485 days.

(21) Appl. No.: 17/536,786

(22) Filed: Nov. 29, 2021

(65) Prior Publication Data

US 2022/0169117 A1 Jun. 2, 2022

Related U.S. Application Data

(60) Provisional application No. 63/120,127, filed on Dec. 1, 2020.

(51) Int. Cl.
| | |
|---|---|
| *B60K 35/00* | (2024.01) |
| *G06F 9/451* | (2018.01) |
| *B60K 35/10* | (2024.01) |
| *F16H 59/02* | (2006.01) |
| *F16H 59/08* | (2006.01) |
| *H02J 7/00* | (2006.01) |

(52) U.S. Cl.
CPC .............. *B60K 35/00* (2013.01); *G06F 9/451* (2018.02); *B60K 35/10* (2024.01); *B60K 2360/11* (2024.01); *B60K 2360/131* (2024.01); *B60K 2360/1438* (2024.01); *B60K 2360/146* (2024.01); *F16H 2059/026* (2013.01); *F16H 59/08* (2013.01); *H02J 7/0042* (2013.01)

(58) Field of Classification Search
CPC ....................................................... F16H 59/08
See application file for complete search history.

(56) References Cited

U.S. PATENT DOCUMENTS

| | | | | | |
|---|---|---|---|---|---|
| 2,968,195 | A | * | 1/1961 | Edgley .................. | B60K 35/10 74/57 |
| 3,520,208 | A | * | 7/1970 | Kinkade ................ | F16H 59/10 74/473.23 |
| 4,126,054 | A | * | 11/1978 | Langford ................ | G05G 5/18 74/473.23 |
| 4,583,171 | A | * | 4/1986 | Hara ....................... | F16H 59/12 477/125 |
| 4,884,057 | A | * | 11/1989 | Leorat .................... | B60K 20/06 74/484 R |
| 6,295,887 | B1 | * | 10/2001 | DeJonge ................ | B60K 35/10 74/483 K |
| 9,021,911 | B2 | * | 5/2015 | Kim ....................... | B60K 20/08 74/473.12 |
| 10,364,883 | B2 | * | 7/2019 | Kim ..................... | F16H 59/0204 |
| 2017/0227118 | A1 | * | 8/2017 | Buttolo ............... | F16H 59/0217 |

* cited by examiner

*Primary Examiner* — Thomas C Diaz
(74) *Attorney, Agent, or Firm* — Price Heneveld LLP

(57) ABSTRACT

A vehicle includes a console positioned within a passenger cabin. A selector interface is defined within the console. The selector interface is selectively operable between a stowed position within the console and an actuating position that exposes control surfaces of the selector interface relative to the console. An operating system is in communication with the selector interface when the selector interface is in the actuating position. An articulating element operates the selector interface between the stowed position and the actuating position. The articulating element is activated through a designated user gesture relative to the console.

11 Claims, 5 Drawing Sheets

ERGONOMIC SELECTOR CONFIGURATION

CROSS-REFERENCE TO RELATED APPLICATION

This application claims priority to and the benefit under 35 U.S.C. § 119(e) of U.S. Provisional Patent Application No. 63/120,127, filed on Dec. 1, 2020, entitled ERGONOMIC SELECTOR CONFIGURATION, the entire disclosure of which is hereby incorporated herein by reference.

FIELD OF THE INVENTION

The present invention generally relates to vehicle selectors, and more specifically, an ergonomic vehicle selector configuration that is incorporated within various features of the console for the vehicle to provide easy access to the selector configuration.

BACKGROUND OF THE INVENTION

Within various vehicles, selectors are included for manipulating certain systems of the vehicle. In particular, the transmission includes a selector for switching gears of the transmission during operation of the vehicle. Typically, these selectors are positioned within an easy-to-reach location within the passenger cabin of the vehicle. These selectors can be mounted to the steering column, or can be attached to various portions of the console for the vehicle.

SUMMARY OF THE INVENTION

According to at least one aspect of the device, a vehicle includes a console positioned within a passenger cabin. A selector interface is defined within the console. The selector interface is selectively operable between a stowed position within the console and an actuating position that exposes control surfaces of the selector interface relative to the console. An operating system is in communication with the selector interface when the selector interface is in the actuating position. An articulating element operates the selector interface between the stowed position and the actuating position. The articulating element is activated through a designated user gesture relative to the console.

According to another aspect of the device, a vehicle includes a console mounted within a passenger cabin. The console includes an interface surface. A selector interface is defined within the interface surface of the console. The selector interface is a graphic user interface that is activated through a designated control gesture performed by a user in relation to the interface surface of the console. An operating system is controllable via the designated control gesture with respect to the graphic user interface.

According to another aspect of the device, a vehicle includes a console mounted within a passenger cabin. A selector interface is incorporated within the console. An operating system is controllable via the selector interface. The selector interface includes a plurality of selector portions within the console. A portion of the plurality of selector portions are placed in an activating state when an engaging actuator is activated.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
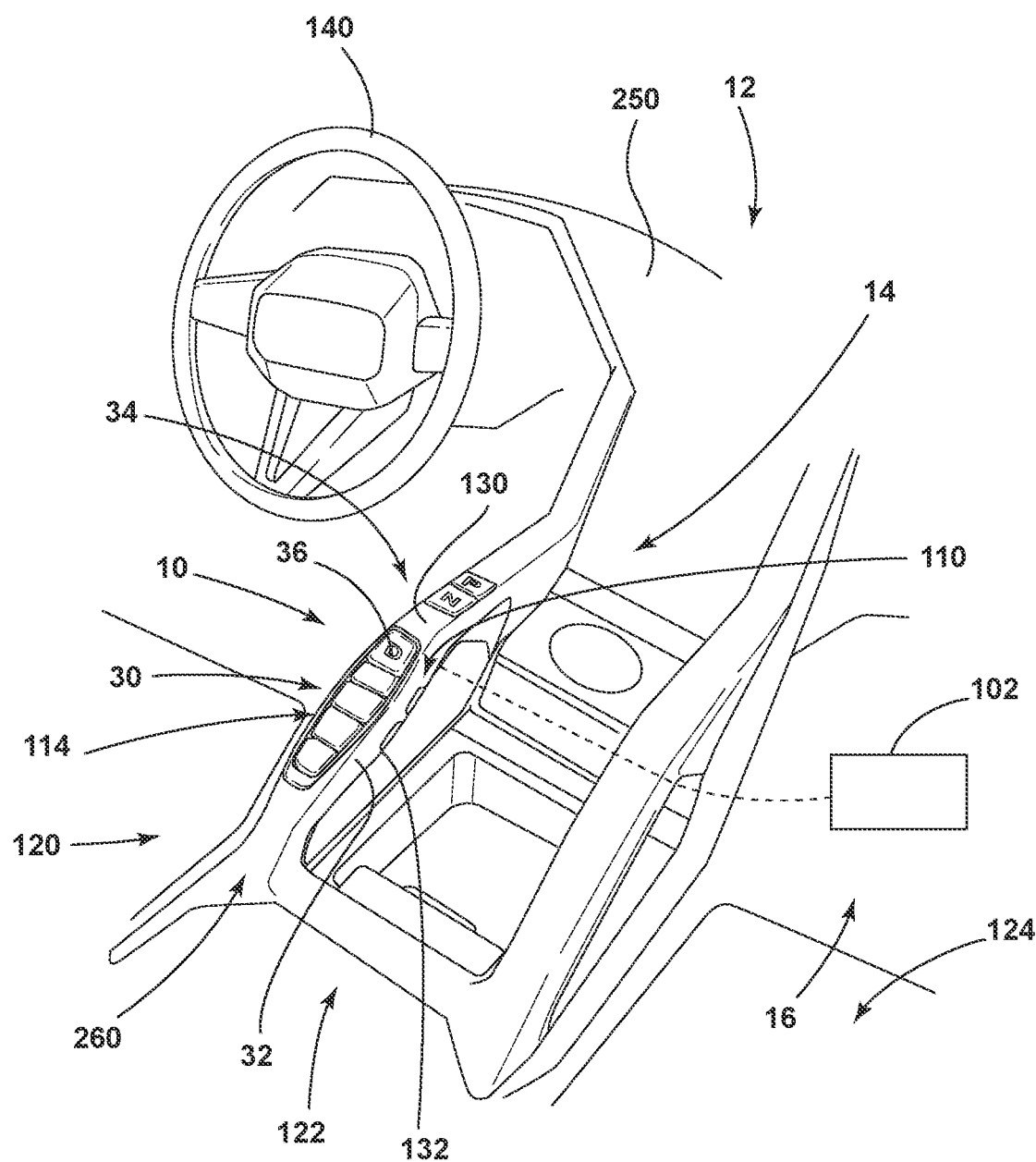
FIG. 1 is a perspective view of a passenger cabin that incorporates an aspect of a selector interface incorporated within a handle of a console for a vehicle.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As exemplified in FIGS. 1-9, reference numeral 10 generally refers to a selector interface that is incorporated within the passenger cabin 12 for a vehicle. A console 14 is positioned within the passenger cabin 12 and typically extends across the front of the passenger cabin 12 near the driver and front passenger seating arrangements. An operating system 16, such as a transmission, suspension system, traction control system, or other similar mechanical system or electrical system is controllable via an action of a user 18 of the vehicle within the passenger cabin 12. Typically, with respect to the operating systems 16, the user 18 will be the driver of the vehicle, but can also be any one of the occupants of the vehicle. The selector interface 10 is incorporated within the console 14. The selector interface 10 is operated through a specific gesture 20 or movement by the user 18 in relation to the selector interface 10 of the console 14. As will be discussed herein, the gestures 20 can be in the form of at least one designated user gesture 90 that is performed relative to the selector interface 10 and the console 14 as well as at least one designated control gesture 92 that is performed relative to the selector interface 10.

Figure 2:
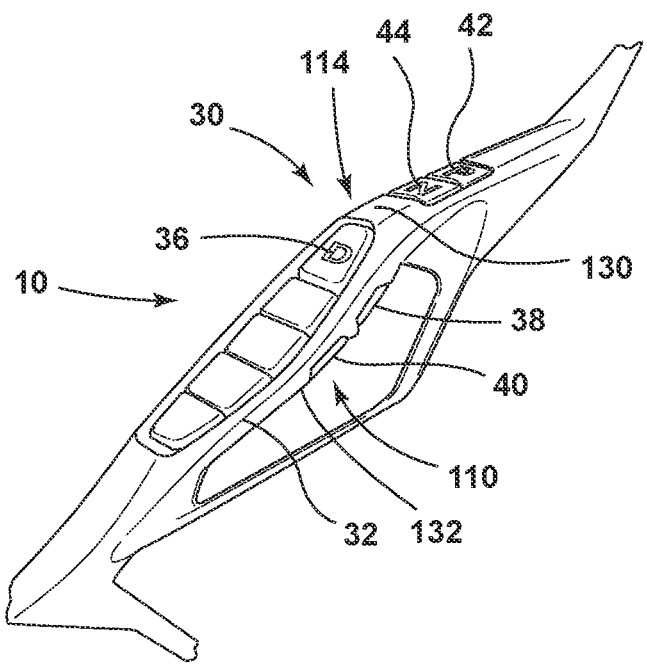
FIG. 2 is an enlarged and isolated perspective view of the selector interface of FIG. 1.
Figure 3:
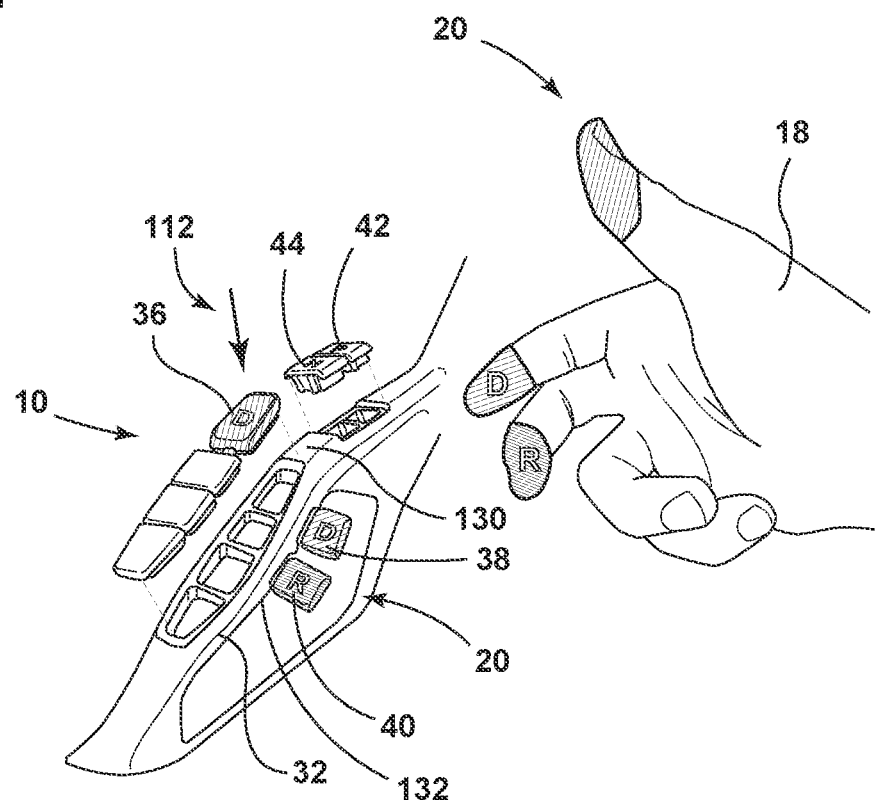
FIG. 3 is a schematic exploded perspective view of the two-stage section of the selector interface of FIG. 2.
Figure 4:
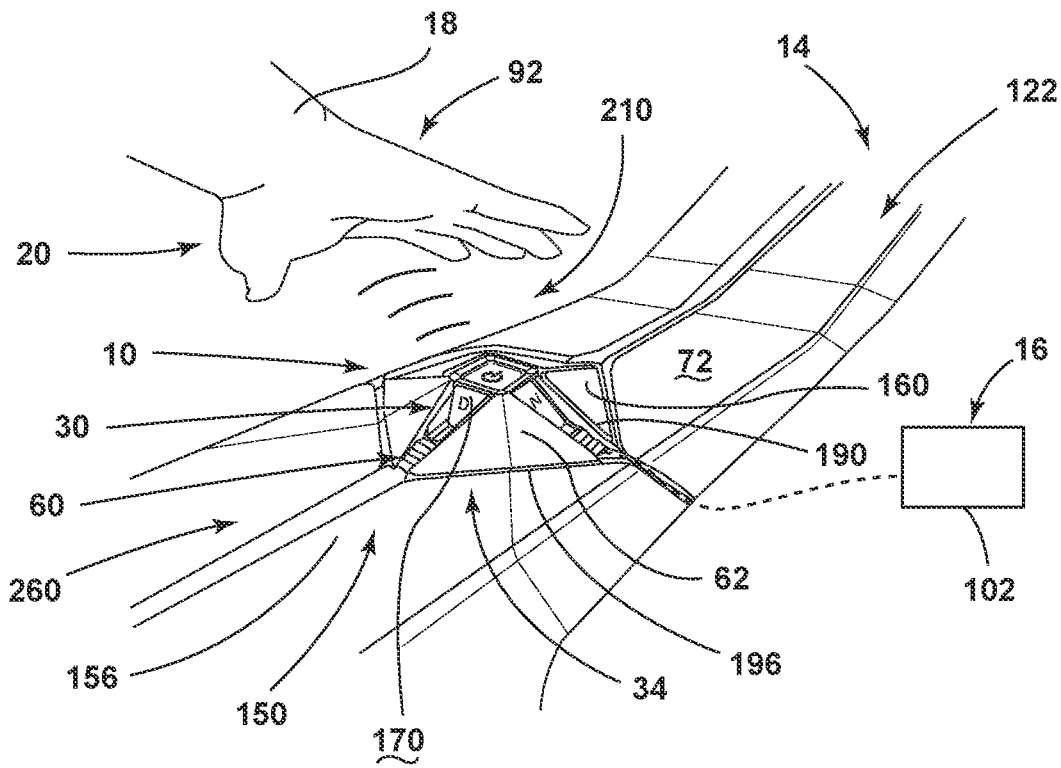
FIG. 4 is a schematic perspective view of a vehicle console that incorporates an aspect of a selector interface incorporated within a central portion of the console.
Figure 5:
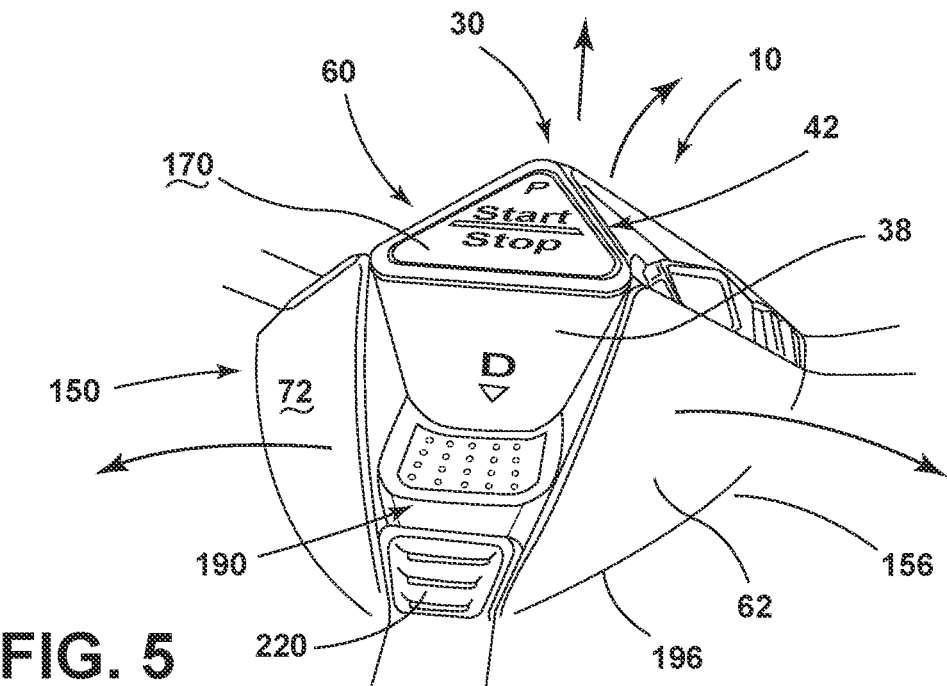
FIG. 5 is an enlarged perspective view of the selector interface shown in an actuating position.
Figure 6:
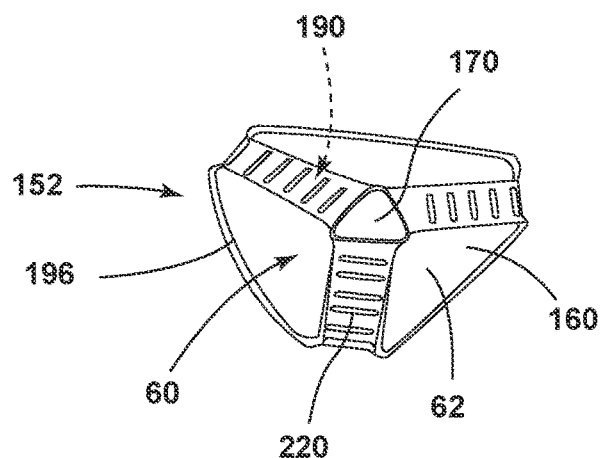
FIG. 6 is a perspective view of the selector interface of FIG. 5 shown in a stowed position within the console.
Figure 7:
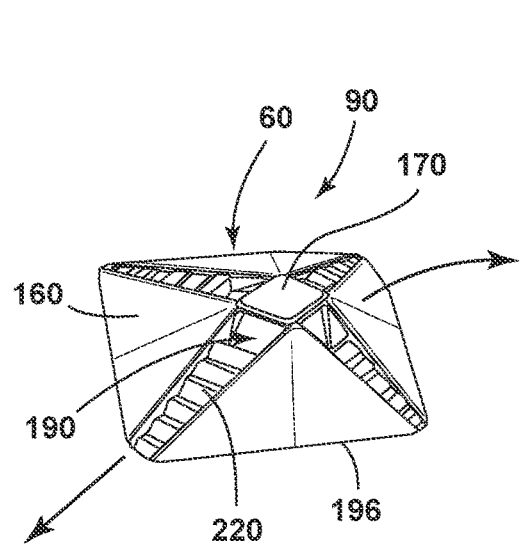
FIG. 7 is an perspective view of the selector interface of FIG. 6 shown transitioning from the stowed position to the actuating position.
Figure 8:
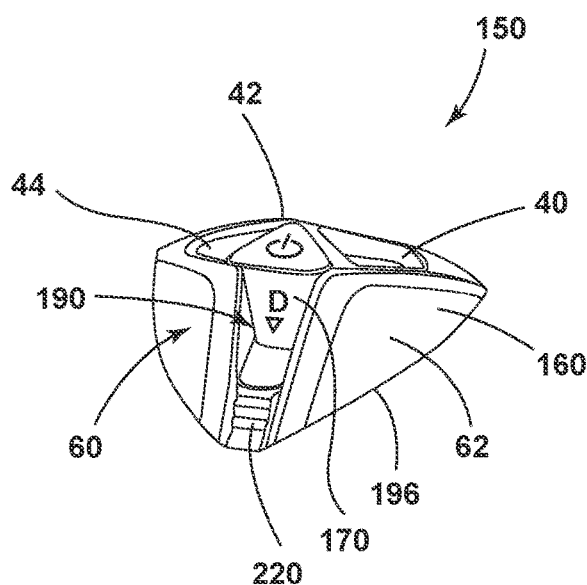
FIG. 8 is an aspect of the selector interface of FIG. 4 shown in the actuating position.

As exemplified in FIGS. 1-3, the selector interface 10 includes a plurality of selector portions 30 that can be in the form of buttons, switches, touchscreens 100, or other similar interface mechanisms. These selector portions 30 are integrated within the console 14. Typically, the selector portions 30 are incorporated within a handle 32 or other similar ergonomic feature 34 that is located for easy access by the user 18 of the vehicle. The selector portions 30 of the selector interface 10 include an engaging actuator 36. This engaging actuator 36 must first be depressed or selected by the user 18 before various other selectable features of the selector interface 10 can be selected. By way of example, and not limitation, the engaging actuator 36 must first be depressed before the user 18 can select drive or reverse 38, 40 for operating the transmission or other operating system 16. In the case of a shift-by-wire mechanism 102 that controls a transmission for the vehicle, only when the engaging actuator 36 is first depressed and remains depressed can the user 18 then activate the two-stage sections 110 that can include drive and reverse 38, 40 of the selector interface 10. Once drive or reverse 38, 40 are selected, the user 18 can then disengage the engaging actuator 36.

It is contemplated that other features of the selector interface 10 such as park 42, neutral 44 or other similar features of the selector interface 10 may be engaged without first depressing the engaging actuator 36. The location of the selector portions 30 coincides with the ergonomic configurations of a hand of a user 18 so that the engaging actuator 36 and the various other selector portions 30 can be easily manipulated during operation of the vehicle. This configuration of the selector interface 10 allows for easier gear actuation without having to look down at a selector interface 10 for the vehicle. Selector portions 30 such as drive 38 and reverse 40 can be positioned where certain fingers of the hand of the user 18 may typically be located. In addition, the incorporation of the engaging actuator 36 limits the occurrence of inadvertent actuating because of the need to depress the engaging actuator 36 before operating the selector portions 30 corresponding to drive and reverse 38, 40. This two-part actuation operates as an at least partial failsafe to prevent inadvertent actuation of drive and reverse 38, 40 of the selector interface 10.

Referring again to FIGS. 1-3, the vehicle includes the console 14 that is positioned within the passenger cabin 12. The selector interface 10 is defined within the console 14. The operating system 16 is controlled via the selector interface 10. The selector interface 10 includes the plurality of selector portions 30 that are positioned within the console 14. A two-stage section 110 of the plurality of selector portions 30 can be placed in an activating state 112 when the engaging actuator 36 is activated by the user 18. Typically, the two-stage section 110 of the plurality of selector portions 30 requires that the engaging actuator 36 be depressed or otherwise activated by a user 18. This action performs the first stage that places the two-stage section 110 in the activating state 112. This allows the user 18 to make a selection within the two-stage section 110 that completes the second stage of the selecting operation. When the first stage has not been completed, the two-stage section 110 is configured to be in an idle state 114, such as when the engaging actuator 36 is idle. As discussed herein, the idle state 114 is typically a default state that occurs before and after the engaging actuator 36 has been depressed or otherwise activated by a user 18.

Referring again to FIGS. 1-3, the two-stage sections 110 of the plurality of selector portions 30 that are placed in the activating state 112 are done so by activation of the engaging actuator 36. This two-stage section 110 of the selector portions 30 is typically in communication with the shift-by-wire mechanism 102 that is in communication with a vehicle transmission. In addition, the two-stage section 110 of the selector portions 30 that is operable through activation of the engaging actuator 36 is typically positioned near the driver seat 120 of the vehicle so that these selector portions 30 can be easily accessed by the driver during operation of the vehicle. This is particularly true where the selector portions 30 are in communication with the shift-by-wire mechanism 102 for the vehicle, or other components of the drive train for the vehicle. In this manner, a center portion 122 of the console 14 extends between the driver seat 120 and the passenger seat 124. Within this center portion 122 of the console 14, the engaging actuator 36 and the section of the selector portions 30 are positioned within easy reach of an operator for the vehicle. As discussed herein, the selector interface 10 is defined within a handle 32 that extends from the center portion 122 of the console 14. In various aspects of the device, an outer surface of the handle 32 can include the selector portions 30 for the selector interface 10. Within these selector portions 30 is the two-stage section 110 that is in communication with the shift-by-wire mechanism 102 for the vehicle. Typically, the two-stage section 110 of the selector interface 10 includes selectors for drive 38 and reverse 40. As exemplified in FIGS. 2-3, the selectors for park 42 and neutral 44 may be operable without use of the engaging actuator 36.

As exemplified in FIGS. 2 and 3, the engaging actuator 36 can be positioned within a top portion 130 of the handle 32. In this position, the engaging actuator 36 can be depressed by the thumb of the operator for completing the first stage of the two-stage operation for the two-stage section 110. Contemporaneously, while the engaging actuator 36 is depressed by the thumb of the operator, the two-stage section 110 of the selector portions 30 can be positioned beneath or on an underside 132 of the handle 32 so that the non-thumb fingers of the operator can be used to conveniently engage the two-stage section 110. As discussed herein, this can be done to select various gear settings that can be engaged through the shift-by-wire mechanism 102. Through this configuration, the user 18 can maintain a grasp on the handle 32 to steady themselves while operating the vehicle, including operating the steering wheel 140 for the vehicle.

According to various aspects of the device, the selector portions 30, including the two-stage section 110 of the selector portions 30 that are coupled with the engaging actuator 36, can be in the form of buttons, touchscreens 100, switches, and other similar tactile or haptic interfaces. It is contemplated that absent activation of the engaging actuator 36, the two-stage sections 110 of the selector portion 30 are typically incapable of being selected or otherwise activated. Once the engaging actuator 36 is depressed, or otherwise engaged by the operator, only then can the operator operatively interface with the two-stage section 110 of the selector portions 30. It is also contemplated that certain sections of the selector portion 30 may not be engageable when a certain gear setting is activated. By way of example, and not limitation, when the vehicle transmission is set to drive 38 and moving forward, the interface for reverse 40 within the two-stage section 110 cannot be selected until such time as the car has come to a complete stop. The same would be true with respect to a user 18 selecting reverse 40 and operating the vehicle in a rearward direction. The interface for drive 38 would not be selectable in this situation until the vehicle were to come to a stop. Other portions of the selector interface 10 can be selected without first operating the engaging actuator 36, as discussed herein. These sections, as exemplified in FIGS. 1-3, can include the selectors for park 42 and neutral 44, which are adapted to be engaged with the thumb of the user 18.

According to various aspects of the device, the selector portions 30 of the selector interface 10 and the two-stage section 110 of the selector portions 30 that is coupled with the engaging actuator 36 can be positioned in other portions of the console 14. In certain aspects, the selector portions 30 can be coupled with a planar surface 72 of the console 14, a particular operable handle 32 of the console 14, a portion of the steering wheel 140, and other similar services within the vehicle.

Referring now to FIGS. 4-8, the console 14 can include an articulating element 60 that extends upward or emerges from a portion of the console 14 after the vehicle has been started. In addition, the articulating element 60 can move to an upward actuating position 150 through the surface 72 of the console 14 when a body part or other portion of the user 18 is sensed by the selector interface 10. When at rest, the articulating element 60 is in a concealed stowed position 152 within a console 14. When activated, the articulating element 60 moves to the actuating position 150 that extends through a surface 72 of the console 14 to allow for engagement or other operation by the user 18 of the vehicle. In certain aspects of the device, the articulating element 60 can operate vertically. In addition, the articulating element 60 can also operate rotationally, and in various angular configurations, to reveal only those selector portions 30 of the selector interface 10 that are able to be engaged based upon the conditions of the vehicle. Other portions of the selector interface 10 can remain concealed by the positioning of the selector interface 10 and the selector portions 30 in relation to the articulating element 60.

By way of example, and not limitation, when the vehicle is operated and set to drive 38, the articulating element 60 can be positioned such that the interface for selecting reverse 40 of the selector interface 10 remains concealed in the stowed position 152 or is otherwise unselectable. In this condition of the vehicle, this feature cannot be selected until such time that the vehicle comes to a complete stop and certain predetermined protocols are met. Similarly, there are certain times when only park 42 of the selector interface 10 is revealed so that the vehicle can be placed in park 42 or removed from park 42. In a further aspect of the device, when the user 18 first enters the vehicle, the articulating element 60 can extend to the actuating position 150 and can reveal only the start/stop portion of the selector interface 10, which can coincide with the interface for selecting park 42.

Surrounding the articulating element 60 are a series of flaps 62, such as articulating panels 160, that can be manipulated with the articulating element 60 to reveal certain features or selector portions 30 of the selector interface 10, as needed during use of the vehicle. When not in use, the flaps 62 can enclose the articulating element 60 within the console 14. The articulating element 60 can be operated through various gestures 20 or hand movements over the console 14, or can simply be operated based upon the positioning of a user 18 within the vehicle, as well as the conditions of the vehicle, during operation. Positioning of the articulating element 60 places the selector interface 10 in a unique plane within the vehicle and only provides access to those features that are able to be accessed at any given time. In addition, the selector interface 10 is able to be concealed by the flaps 62 when not in use, or when the vehicle is deactivated. This can provide an additional anti-theft or security feature for the vehicle that prevents an unwanted or unauthorized engagement of the selector interface 10 when the vehicle is not in use.

Referring again to FIGS. 4-8, the selector interface 10 defined within the console 14 can be selectively operable between the stowed position 152 within the console 14 or flush with the console 14 and an actuating position 150 that exposes control surfaces 170 of the selector interface 10 relative to the console 14. The now-exposed control surfaces 170 can be hidden in the stowed position 152 and revealed as the selector interface 10 is moved to the actuating position 150. In addition, certain exposed control surfaces 170 can be visible in each of the 1 and the actuating position 150, with the exposed control surface 170 being operatively engaged when the selector interface 10 moves to the actuating position 150. Conversely, in the stowed position 152, the control surfaces 170 may be visible, but may be rendered idle and typically unusable until such time as the selector interface 10 moves to the actuating position 150.

According to the various aspects of the device, as exemplified in FIGS. 4-8, the operating system 16 for the vehicle can be placed in communication with the selector interface 10. Operative communication between the operating system 16 and the selector interface 10 can be achieved when the selector interface 10 is moved to the actuating position 150. It is contemplated that an articulating element 60 operates the selector interface 10 between the stowed position 152 and the actuating position 150. The articulating element 60 can be activated through a designated stowed position 152 user gesture 90 relative to the console 14. The designated user gesture 90 can be in the form of placing a body part over the selector interface 10 in the stowed position 152, or moving an object or a body part of the user 18 in a particular direction, orientation or pattern over the selector interface 10 in the stowed position 152. By way of example, and not limitation, moving the selector interface 10 from the stowed position 152 to the actuating position 150 can be achieved by the user 18 holding their hand over the selector interface 10 for a designated period of time. When the designated user gesture 90 is performed, the selector interface 10, via the articulating element 60, moves from the stowed position 152 to the actuating position 150.

According to various aspects of the device, as exemplified in FIGS. 4-8, the articulating element 60 can include a plurality of articulating panels 160 that are operably attached to an outer panel 156 of the console 14. In the stowed position 152, these articulating panels 160 can be generally flush or co-planar of with a surrounding surface 72 of the outer panel 156 of the console 14. These articulating panels 160 can be in the form of deflecting panels, rigid panels, flexible members, or other similar panels that can move with the selector interface 10 between the stowed position 152 and the actuating position 150. The articulating panels 160 can rotate, bend, or otherwise deflect relative to a surface 72 of the console 14, to the actuating position 150. The articulating panels 160 in the actuating position 150 open and allow for the selector interface 10 to move to a position that is accessible to the user 18.

According to the various aspects of the device, the various actuating panels can rotate or otherwise deflect relative to hinging portions 196 of the console 14. As these articulating panels 160 rotate at the hinging portions 196, various gaps 190 between the articulating panels 160 can be exposed or become larger. Within these gaps 190 that are defined between the articulating panels 160 in the actuating position 150, the various control surfaces 170 that are exposed in the actuating position 150 can be revealed, or become operable.

Referring again to FIGS. 4-8, the designated user gesture 90 that is used to operate the articulating element 60 between the stowed position 152 and the actuating position 150 is typically performed within a gesture area 210 adjacent to a surface 72 of the console 14. By way of example, and not limitation, a user 18 can operate at least a portion of the selector interface and the articulating element 60 to the actuating position 150 by placing their hand or move their hand over the selector interface 10 and within the gesture area 210. This movement can be tracked within the gesture area 210 by various positioning sensors and/or motion sensors. Such sensors can include, but are not limited to, time of flight (TOF) sensors, proximity sensors, cameras, and other similar motion and proximity sensors. Voice commands can also be used for operating the articulating element 60 between the stowed position 152 and the actuating position 150. Gestures 20 can also be used for manipulating portions of the selector interface 10. In such an aspect of the device, portions of the selector interface 10, while in the actuating position 150, can be operated through designated control gestures 92 that are made relative to the selector interface 10. These control gestures 92 can be physical interactions 242 with the selector interface 10 or movements made in proximity to the selector interface 10. Such control gestures 92 can be movements of a hand, various hand gestures or hand movements, and other similar gestures 20 that can be made by the user 18 with respect to the gesture area 210 or the selector interface 10 for achieving a certain control result. The control result can be in relation to the transmission for the vehicle (via the shift-by-wire mechanism 102), adjusting a comfort setting with the vehicle, adjusting an entertainment system within the vehicle, and other various vehicle-related controls.

Referring again to FIGS. 6-8, as the articulating element 60 moves between the stowed position 152 and the actuating position 150, the articulating panels 160 in the stowed position 152 can be oriented to be flush with the surface 72 of the console 14. Such configuration provides a generally hidden configuration of certain portions of the selector interface 10 when the articulating element 60 is in the stowed position 152. As the articulating element 60 moves to the actuating position 150, portions of the selector interface 10 are revealed and typically stand proud of the surface 72 of the console 14. It is also contemplated that certain portions of the selector interface 10 are accessible and operative in each of the stowed position 152 and the actuating position 150. Such portions of the selector interface 10 would be those portions that are typically accessed repeatedly or most frequently during operation of the vehicle and while the vehicle may be idle, or where these portions may need to be readily accessible at all times. By way of example, and not limitation, these continuously accessible portions of the selector interface 10 may be related to a power control, certain safety features, such as hazard lights, certain comfort and entertainment controls and a gear shift mechanism, and in particular, a park setting of the vehicle, and other vehicle-related interface mechanisms.

Referring again to FIGS. 4-8, the plurality of articulating panels 160 of the articulating element 60 can include a number of articulating panels 160. As exemplified in FIGS. 4-8, the articulating element can include three or four articulating panels 160 with gaps 190 defined between each of the panels, at least in the actuating position 150. As discussed herein, the selector interface 10 can include various gaps 190 that are defined between the articulating panels 160 when the selector interface 10 is in the actuating position 150. When moved to the actuating position 150, the various articulating panels 160 deflect away from one another and increase the size of various gaps 190 defined between these articulating panels 160. Within these gaps 190, certain control surfaces 170 of the selector interface 10 emerge and become operatively accessible to the user 18 within the vehicle.

In addition to the gaps 190 that are defined between the various articulating panels 160, operable doors 220 can also be positioned within these gaps 190. As these doors 220 operate relative to the selector interface 10, additional features within the selector interface 10 can become visible. It is contemplated that these doors 220 can be in the form of a plurality of doors 220 that operate independently or collectively while the articulating element 60 is in the stowed position 152. Accordingly, the selector interface 10 can include a number of operable mechanisms that can actuate to provide different functionality to the user 18 for operating the selector interface 10.

By way of example, and not limitation, where a user 18 desires to engage only a portion of the control surfaces 170 of the selector interface 10, one of the doors 220 can slidably operate within the gaps 190 to reveal a particular and desired control surface 170 of the selector interface 10. Where a more comprehensive selection of features may be needed or desired, the articulating element 60 can operate to the actuating position 150 to provide more accessibility with respect to the control surfaces 170 of the selector interface 10. Greater accessibility to the selector interface 10 may be desired where the car is placed in park, stopped in traffic, wherein the vehicle is operated autonomously, or other situations where the user 18 of the vehicle is able to devote a certain amount of attention to the selector interface 10. During operation of the vehicle, more discrete and limited numbers of functions may be accessible via the selector interface 10 so that the operator can devote more attention to other tasks at hand.

It is contemplated that certain gaps 190, for aesthetic purposes, may be visible when the articulating element 60 is in each of the stowed position 152 and the actuating position 150. As the articulating element 60 moves to the actuating position 150, the gaps 190 can be increased in size to provide additional functionality for the selector interface 10.

Figure 9:
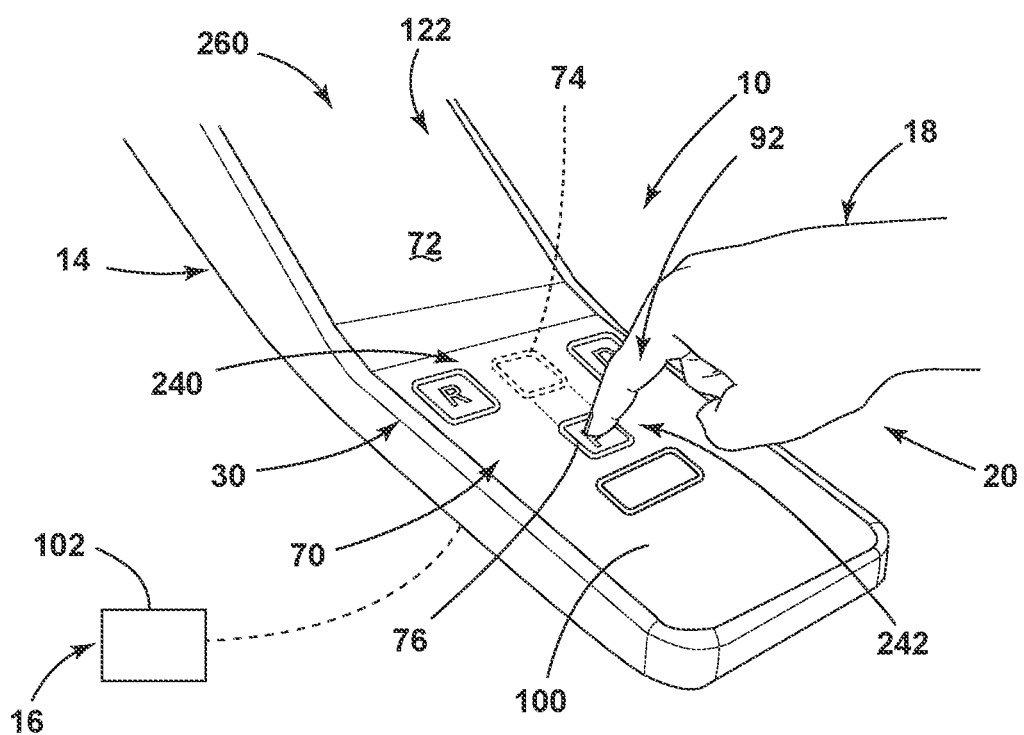
FIG. 9 is a perspective schematic diagram illustrating an aspect of the selector interface incorporated within a touchscreen surface of the console.

Referring now to FIG. 9, the selector interface 10 can include a virtual display 70 that is incorporated within a surface 72 of the console 14. Actuating the selector interface 10 through the virtual display 70 can be addressed through a gesture 20 or other movement of the user 18. By way of example, and not limitation, shifting gears of the transmission for the vehicle, via the shift-by-wire mechanism 102, can be accomplished by sliding a virtual selector portion 30 from a starting position 74 to an engaged position 76. Using the virtual display 70, only those features of the selector interface 10 that are able to be operated at that time will appear on the virtual display 70. These inaccessible features may also be visible and visually muted or otherwise obfuscated and unable to be selected. As discussed previously, as a non-limiting example, when the vehicle is operating in drive 38 and is moving forward, the selection icon for reverse 40 of the selector interface 10 will not typically be visible and/or selectable until the vehicle comes to a complete stop, and other various protocols occur with respect to the vehicle. Only after all of the protocols are achieved will certain selector portions 30 of the selector interface 10 appear for selectable engagement by the user 18 of the vehicle. In addition, various motions or gestures 20 by the user 18 can be utilized for engaging different selector portions 30 of the selector interface 10. These gestures 20 can be defined based upon the current situation of the vehicle, preferences of one or more users 18, the overall design of the vehicle, and other similar considerations.

Using the selector interface 10, various aspects, as described herein, can be used for providing an ergonomic configuration of the selector interface 10 within the passenger cabin 12. Accordingly, the console 14 can be utilized as a surface 72 that is easily accessed by the user 18 for engaging the selector interface 10 and making various modifications to the vehicle during its operation.

Referring again to FIG. 9, the selector interface 10 is defined within an interface surface 72 of the console 14 that can be in the form of a virtual display 70 incorporated within the surface 72 of the console 14. This virtual display 70 can be within the center portion 122 of the console 14, along the front portion 250 (shown in FIG. 1) of the console 14 that extends in front of and between the driver seat 120 and the passenger seat 124, as well as other portions of the passenger cabin 12 for the vehicle. The selector interface 10 is in the form of a graphic user interface 240 that is activated through a designated control gesture 92 performed by one or more of the users 18 of the vehicle in relation to the interface surface 72 of the console 14. This use of the control gesture 92 provides instructions that are delivered from the selector interface 10 to an operating system 16 for the vehicle that is controllable via the graphic user interface 240. The particular designated control gesture 92 can be a physical interaction 242 with the graphic user interface 240 or some other gesture 20 that is made over, adjacent or near to the interface surface 72 for the console 14. Typically, the selector interface 10 includes a tactile interface portion that includes a touchscreen 100 that the user 18 can interface with in a physical manner. A display can also be incorporated within the interface surface 72 so that the user 18 can visualize, through the use of the graphic user interface 240, the designated control gesture 92 that has been performed relative to the selector interface 10, such as within a gesture area 210 adjacent to the console 14.

Referring again to FIG. 9, as discussed herein, one of the operating systems 16 that can be controlled using the selector interface 10 is a shift-by-wire mechanism 102 that is used to convert instructions from the selector interface 10 into mechanical operations of the transmission for the vehicle. The shift-by-wire mechanism 102 is a digital interface that controls a transmission for the vehicle during operation. Typically, at least a portion of the graphic user interface 240 that controls the shift-by-wire mechanism 102 is continually accessible to a user 18 of the vehicle. Alternatively, certain aspects of the selector interface 10 may be hidden or otherwise rendered inoperative at certain times. These times can include occasions when certain portions of the selector interface 10 may be unnecessary or undesirable at that particular point in time.

Referring again to FIG. 9, it is contemplated that the interface surface 72 of the console 14 can include a wireless battery charging interface. Such an interface can utilize wireless charging technology to provide charging to various devices, such as cell phones, tablets, and other devices.

The graphic user interface 240 can include a selectively accessible portion that is revealed upon performance of a particular designated control gesture 92 or a designated user gesture 90. The use of these gestures 20 can modify the graphic user interface 240 to reveal or hide certain features incorporated within the selector interface 10. As discussed herein, these gestures 20 can be physical interactions 242 with the interface surface 72 or gestural motions made adjacent to the interface surface 72.

During use of the selector interface 10, portions of the graphic user interface 240 may be movable within the virtual display 70. In this manner, icons or other portions of the graphic user interface 240 may be movable within the virtual display 70 to highlight those options and features that may be selectable by the user 18 of the vehicle. When the vehicle is in part, certain portions of a gear selection interface may be moved or adjusted to a prominent position within the virtual display 70. Other features may be moved to a less prominent positon or adjusted to be at least partially obfuscated.

According to the various aspects of the selector interface, as described herein, portions of the selector interface can be placed within different portions of the vehicle. In the case of the passenger seats 124, the selector interface can be used to control certain entertainment and comfort settings that relate to a corresponding seating position of the passenger cabin 12 or the entire passenger cabin 12. In the case of an autonomous vehicle, it is contemplated that any one of the seating positions can be designated as a control position 260 with access to a more comprehensive set of features and control surfaces 170 of the selector interface 10. This control position 260 of the selector interface 10 can also have override control to supersede the controls of any of the other seating positions. Typically, this control position 260 will be located in the front row of the vehicle and usually near the driver seat 120.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A vehicle comprising:
a console mounted within a passenger cabin;
a selector interface incorporated within the console;

an operating system that is controllable via the selector interface; and wherein the selector interface includes a plurality of selector portions within a handle of the console, the handle including a top surface and an accessible underside that opposes the top surface, and wherein a portion of the plurality of selector portions are placed within the accessible underside of the handle, and wherein the portion of the plurality of selector portions are placed in an activating state when an engaging actuator is independently activated, the engaging actuator being located within the top surface of the handle.

2. The vehicle of claim 1, wherein the portion of the plurality of selector portions is in an idle state when the engaging actuator is idle.

3. The vehicle of claim 2, wherein the portion of the plurality of selector portions that is placed in the activating state upon activation of the engaging actuator is in communication with a shift-by-wire mechanism that is in communication with a vehicle transmission.

4. The vehicle of claim 3, wherein the selector interface is incorporated within a center portion of the console that extends between a driver seat and a passenger seat.

5. The vehicle of claim 4, wherein the selector interface is defined within the handle that extends from the center portion of the console, wherein the engaging actuator is positioned within the top surface of the handle.

6. The vehicle of claim 1, wherein the portion of the plurality of selector portions includes a drive selector and a reverse selector.

7. The vehicle of claim 6, wherein the plurality of selector portions includes a neutral selector and a park selector that are positioned proximate the engaging actuator.

8. The vehicle of claim 7, wherein the park selector and the neutral selector are configured to be activated independent of the engaging actuator.

9. The vehicle of claim 6, wherein the engaging actuator defines a two-stage selection with respect to the drive selector and the reverse selector, wherein activation of the portion of the plurality of selector portions requires that the engaging actuator be activated.

10. The vehicle of claim 6, wherein activation of the engaging actuator allows only one selector of the drive selector and the reverse selector to be activated.

11. The vehicle of claim 1, wherein the engaging actuator is configured to be activated by a thumb of a user and the portion of the plurality of selector portions are configured to be activated by a non-thumb finger.

* * * * *